Oct. 23, 1934.  W. L. BURNER  1,977,819
DUMP CAR
Filed July 9, 1927  2 Sheets-Sheet 2
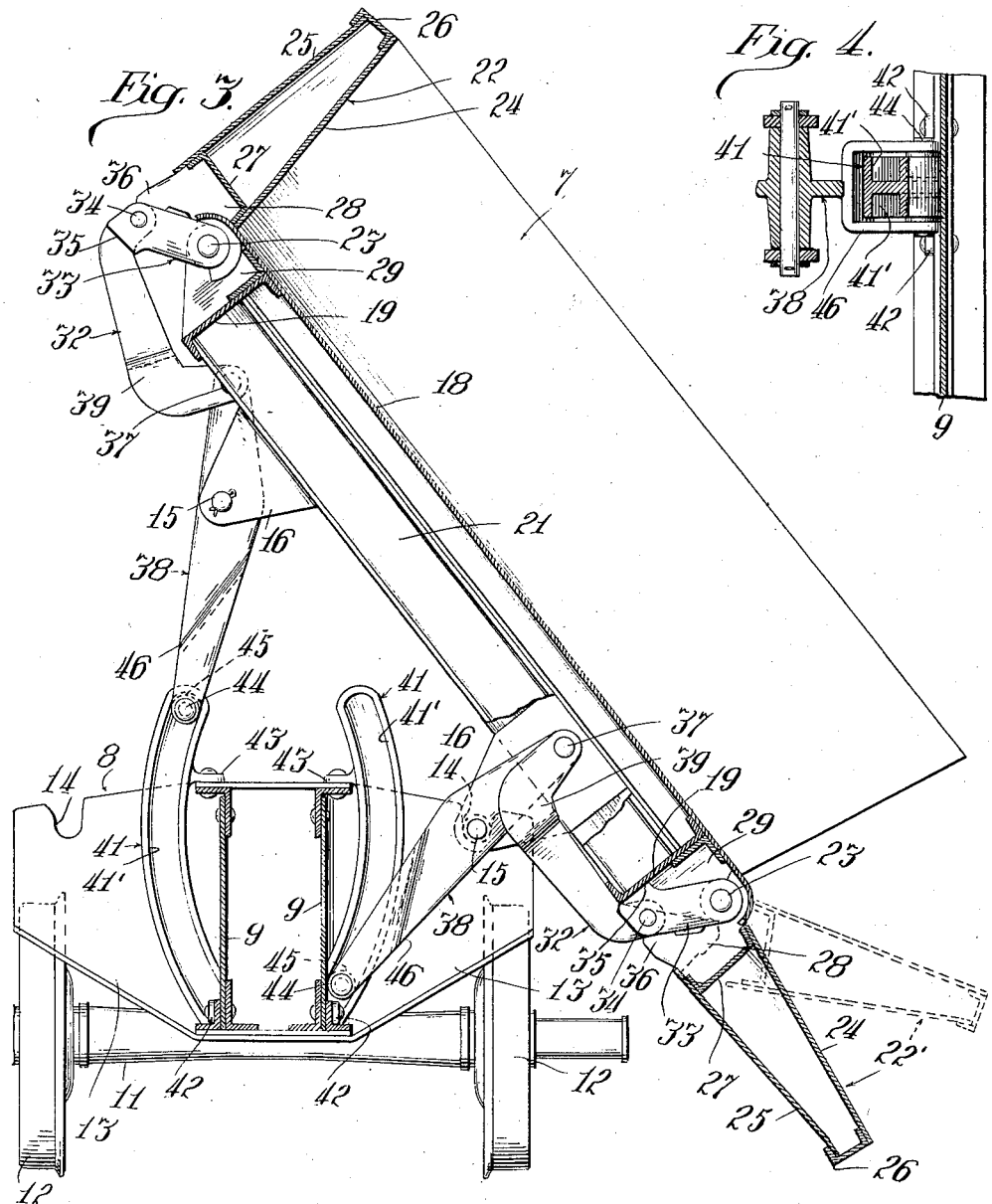
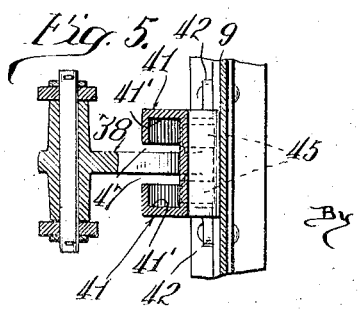
Witness
Milton Lenoir
Inventor
William L. Burner,
By John L. Jackson.
Attorney Patented Oct. 23, 1934

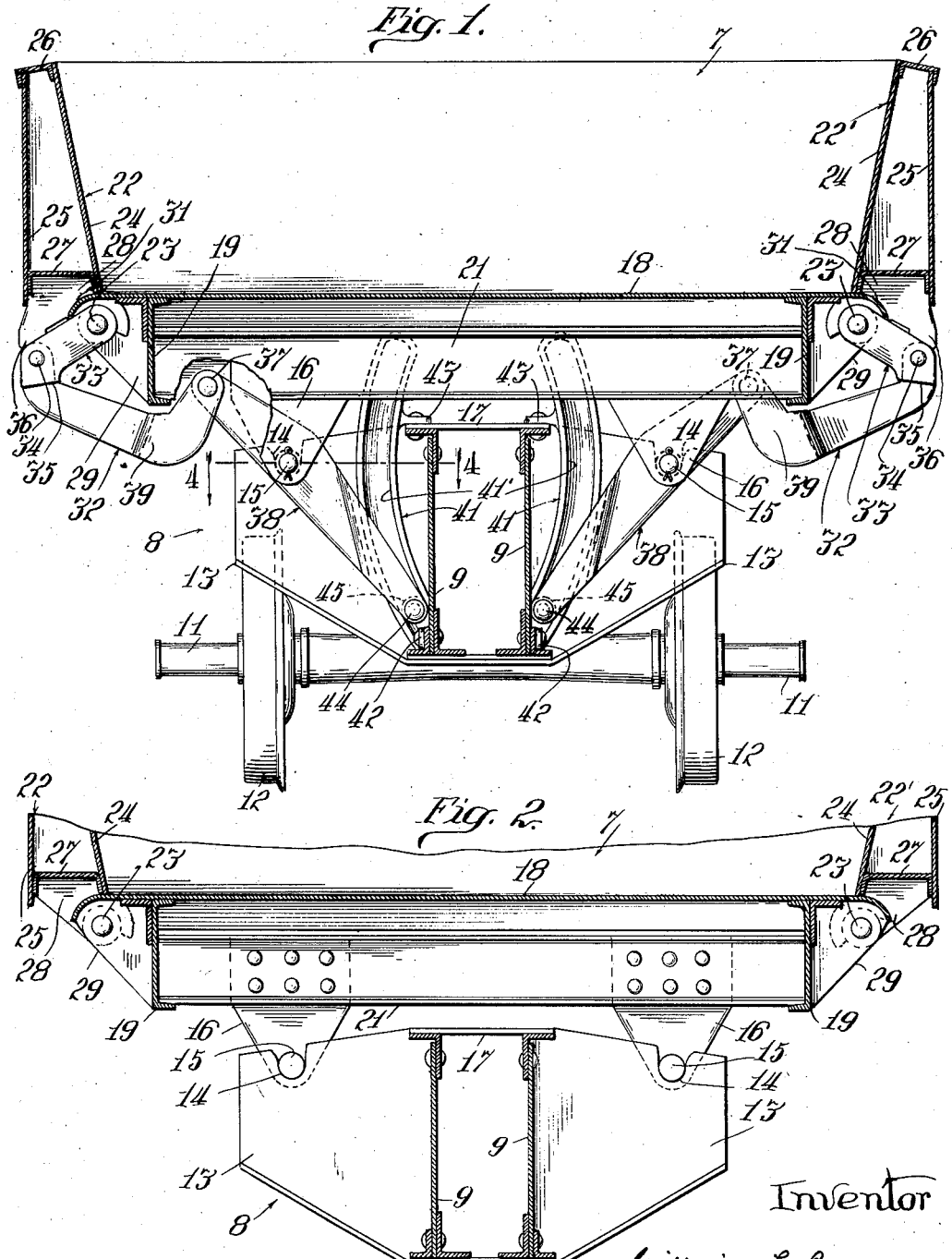

1,977,819

UNITED STATES PATENT OFFICE 1,977,819

DUMP CAR

William L. Burner, Columbus, Ohio, assignor, by mesne assignments, to Western-Austin Company, Aurora, Ill., a corporation of Illinois Application July 9, 1927, Serial No. 204,505

48 Claims. (Cl. 105—273)

My invention relates to dump cars of the tilting bed type wherein the bed is provided with side gates adapted to be swung open automatically at the low side of the bed when the latter is tilted for a dumping operation.

The invention has for its general object to provide improved operating mechanism for these gates which will hold the gates tightly closed when the bed is in its normal or horizontal position, and which during a dumping operation to either side, will result in the movement of the gate at the dumping side to a downwardly inclined position, approximately in continuation of the floor of the car bed, while holding the gate at the opposite or high side in a closed or substantially closed position.

The particular form of operating mechanism disclosed herein is characterized by numerous improved features of construction which will appear from the following detailed description of a preferred embodiment of the invention. In the accompanying drawings illustrating such embodiment:

Figure 1 is a transverse sectional view through a car embodying the invention, certain parts of the running gear being omitted for clarity of illustration.

Figure 2 is a similar sectional view on a different transverse plane, illustrating the fulcrum mounting of the bed on the under body.

Figure 3 is a view similar to Figure 1, illustrating the bed in dumping position.

Figure 4 is a detail sectional view taken on the plane of the line 4—4 Figure 1; and Figure 5 is a similar sectional view illustrating a modified construction.

The car bed 7, and the under body or frame 8 that supports it, may be of any desired construction, and the bed may be mounted on the under body to swing laterally either about fixed pivots or upon laterally spaced fulcrums or trunnions, but in the accompanying drawings I have chosen to illustrate my improvements applied to a car having the latter construction. The operation of dumping the car bed may be performed manually or through power derived from air or steam cylinders having operative connection to raise either side of the bed. This practice of employing power cylinders for tilting the bed is well known, and inasmuch as such apparatus forms no part of the present invention I have not shown the same.

The under body 8 comprises two longitudinally extending beams 9 which form the center sill of such under body structure. This center sill is mounted on trucks (not shown) in the usual way, which trucks have the usual bearings for engaging over the ends of the axles 11 on which the wheels 12 are mounted. At two or more points spaced along the length of the car, heavy frame members 13—13 extend laterally from the beams 9 to form supports on which the tilting bed 7 rests. The upper edges of said frame members are formed with seating recesses or notches 14 adjacent to the outer ends thereof, such seating recesses receiving heavy bearing pins 15 which are carried by brackets 16 secured to the under side of the bed 7. These bearing pins and recesses form two laterally disposed rocking fulcra, around which the bed has tilting movement to either side, as illustrated in Figure 3. The supporting members 13 may be arranged in pairs to engage with the oppositely projecting ends of the bearing pin 15 on each side of the bracket 16, or the brackets 16 may be arranged in pairs to support the opposite ends of each pin 15, and a single frame member 13 may be arranged to engage with the pin between such brackets. A reinforcing bar or strut 17 extends across the upper ends of the sill beams 9 and ties the upper edges of the supporting frame members 13 together.

The car bed 7 comprises any suitable construction of floor 18 mounted on longitudinally extending sill rails 19. Transversely extending bars 21 reinforce the frame of the bed at the ends and intermediate points thereof. The fulcrum brackets 16 are riveted to these transversely extending bars 21. At opposite sides of the bed are mounted two side gates or doors 22—22', pivoted adjacent to their lower margins on pivot pins 23 carried by the side margins of the bed, so that such gates may swing outward and downward, as illustrated in Figure 3. The side gates are preferably made up of spaced plates 24 and 25 connected at their upper converging edges by a channel bar 26, and reinforced at their lower edges by a channel bar 27. Secured to the lower edge of each door at spaced points along its length are pivot brackets 28 which have suitable bearing support on the pivot pins 23. Such pivot pins are carried by brackets 29 which project laterally from the sill rails 19 of the car bed, below the floor level thereof. The lateral edges of the floor 18 are preferably formed with downwardly curved lips or flanges 31, over which the gates swing in their opening movement, these lips or flanges forming continuations of the floor for preventing any part of the load from falling in upon the pivot pins 23 or operating linkage at the dumping side of the bed when the gate is moved to open position, such function of these lips or flanges being clearly illustrated in Figure 3. The brackets 28 which pivotally support each gate on the pivot pins 23 may extent down through slots cut in such lips or flanges 31.

The gate operating mechanisms are duplicates for both gates and each comprises a bent link 32 which has operative connection at its outer end with its respective gate 22—22'. Such links may have direct pivotal connection at their outer ends to the lower ends of the gate brackets 28, but as illustrative of what I consider a preferred construction I have shown the outer ends of these links as being pivotally connected to secondary links 33, which serve as intermediate members for controlling the positions of the gates. The inner or upper ends of such links 33 are pivotally mounted on the hinge pins 23, about which the gates swing. The outer ends of such links are pivoted at 34 to the upwardly turned outer ends of the bent links 32, the secondary links preferably having bifurcated ends for receiving the outer pivot ends of the links 32. The outer ends of the secondary links 33 also have square cut ends or shoulders 35 which are adapted, in the opening movement of a gate, to strike the outer side of the adjacent frame rail 19 for limiting the downward pivotal movement of the gate to a predetermined angle as illustrated at the lower side of the bed in Figure 3. The pivot bracket 28 of each gate has a downwardly extending projection or foot 36 which is adapted to bear on the inclined upper surface of the secondary link 33, or upon the upwardly extending pivot end of the link 32.

The inner ends of the links 32 project upwardly at an angle under the frame of the bed, whereby to clear the lower edges of the sill bars 19 and to dispose their inner pivotal connections 37 substantially at the points illustrated. These links or pivoted members 32, by their positions relative to the bed, control the positions of their respective gates through the links 33. The inner pivots 37 connect the links 32 to the upper ends of long inclined arms or levers 38, which have pivotal connection with the under body and also with the bed. The inner ends of the links 32 are preferably forked, as indicated at 39, to engage over opposite sides of their respective arms or levers 38. Each arm or lever is pivotally connected intermediate its ends on the adjacent fulcrum bearing pin 15, or on a separate pivot pin carried by the bed and alined coincidently with the bearing pins 15. Both levers 38 extend downwardly and inwardly from the bearing pins and have their lower ends connected for sliding and pivotal movement in curved tracks or guides 41, which are carried by the under frame structure. Each of said tracks or guides is curved on an arc having its center concentric with the center of the opposite fulcrum pin socket 14 in the opposite frame member 13. The lower ends of such guides have bracket portions 42 which are secured to the lower edges of the sill beams 9, and the upper portions of the guides are held in place by lugs 43 which project inwardly therefrom and are secured to the ends of the reinforcing cross bar 17. The upper ends of the guides project from the under body up between the cross bars 21 of the bed, so as to give the desired range of sliding movement of the levers 38, necessary in the tilting of the bed. The lower ends of the levers carry pivot studs 44 having rollers 45 mounted thereon, these rollers tracking in the flanged guides 41. In the construction shrown in Figures 1, 3 and 4 the guides are of H section so as to form grooved guiding tracks 41' in the outer sides thereof. For this construction of guide the lower end of each lever 38 is forked to embrace the guide, as indicated at 46 in Figure 4, and the two rollers 45 are mounted on the inner sides of the fork arms for engaging in the grooves 41'. In the alternative construction illustrated in Figure 5, the guide 41 is of C or box-like cross section having a longitudinal slot 47 formed in its outer wall. In such construction the grooves 41' are formed on the inner sides of the guide, and the end of the lever 38 extends through the slot 47 and has its two rollers 45 mounted on the opposite sides thereof for engaging in the grooves 41'. It will be noted from Figures 1 and 3 that the upper and lower ends of the guides 41 are closed so that the roller ends of the levers 38 cannot move out of such guides, this also being true of the modified construction shown in Figure 5.

Referring now to the action of these gate-operating mechanisms, it will be noted from Figure 1 that when the bed is in its normal horizontal position, any pressure of the load acting outwardly on the gates will be incapable of opening the same because of the inability of either link 32 to move inwardly; that is to say, opening movement of either gate requires that the secondary link 33 extending under the bottom of the gate swing downwardly and inwardly, and this link is incapable of such movement at this time owing to the fact that the inner end of the cooperating link 32 cannot swing inwardly because of its pivotal connection with the stationarily-held lever 38. Thus, any such outward pressure acting on the gates is borne as an inwardly acting thrust effective on the pivot 37 and on the upper arm of the lever 38. When the bed is tilted to dump to either side the lower end of the lever 38 on the dumping side of the car remains at the bottom of its guide 41, and the lower end of the lever 38 on the rising side of the car moves upwardly in its guide 41. Owing to the fact that both guides are formed concentrically with the opposite rocker seats 14, the lever 38 on the rising side of the bed will not undergo any angular movement about its intermediate pivot 15 in such dumping operation, but will remain in the same angular position with respect to the bed, that it occupied when the bed was horizontal. Thus, inasmuch as the pivot 37 of this lever remains in its normal position, the gate at the upper side of the bed will be held closed. Any outward pressure effective on the gate when the tilting movement is started will still be resisted by the pivot 37, owing to the fact that the lower end of the lever 38 is confined in its guide 41 and hence cannot swing relative to the bed. At the dumping side of the car the lever 38 will remain in the same position with respect to the under body that it occupied when the bed was horizontal. While the bed is swinging about the axis of the rocker pins 15 at the dumping side of the car, the outer pivot end 34 of the link 32 at this side of the car is incapable of following concentrically the tilting movement of the bed owing to the fact that the inner end of such link is connected to the upper pivot 37, which is located upwardly and outwardly from the pivot axis 15. Thus the outer end 34 of the link is compelled to swing inwardly and downwardly with respect to the bed during the tilting thereof, thereby swinging the secondary link inwardly towards the adjacent sill rail of the bed. With such swinging movement of the secondary link 33 the adjacent gate will also swing downwardly. When the bed reaches the limit of its tilting movment the secondary link 33 also reaches the end of its swinging movement, the latter resulting from the engagement of the stop shoulder 35 with the side of the sill rail 19. In this position of the secondary link the gate is held against further swinging movement by engagement of its foot or projection 36 with the outer side of the link, such fully opened position of the gate being indicated in full lines. It will be noted that the gate in this position serves as a chute for directing the load outwardly from the side of the car. In the event that the outer edge of the gate should strike a previously dumped pile of earth, or some other projection preventing the complete opening of the gate, represented, for example, by the dotted line position of the gate in Figure 3, the link 33 through its one-way connection with the gate would be permitted to move to the limit of its gate opening movement without requiring corresponding movement of the gate, thus avoiding breakage of the parts in such event of the gate being unable to move to open position. In the return movement of the bed to horizontal position the pivot end 34 of the link 32 will be compelled to swing outwardly with respect to the bed, and hence will swing the open gate upwardly to its closed position.

It will be understood, of course, that the foregoing arrangment of gate-operating linkage will be provided at each end of the car, and, if desired, at any intermediate point of the car.

What I claim as my invention and desire to secure by Letters Patent is:

1. A dump car comprising an under frame, a tilting bed mounted thereon, a side gate connected with the bed to swing downwardly into open position, and means for controlling the operation of said gate comprising a pivoted member which, by its position relative to said bed, controls the downward movement of said gate, and a member pivotally connected with said bed and connected to said under frame for pivotal and translational movement relative thereto for controlling the position of said pivoted member relative to said bed.

2. A dump car comprising an under frame, a tilting bed mounted thereon for rocking movement about laterally spaced fulcrums, side gates connected with the opposite sides of the bed to swing downwardly into open position, and means for controlling the operation of each gate comprising a pivoted member, which, by its position relative to said bed, controls the downward movement of the corresponding gate, and an arm having slidable and pivotal connection with said under frame on the side adjacent the corresponding gate for controlling the position of said pivoted member relative to said bed.

3. A dump car comprising an under frame, a tilting bed mounted thereon for rocking movement about laterally spaced axes, a side gate connected with said bed to swing downwardly into open position, and mechanism for controlling the operation of said gate comprising a member having pivotal connection with said bed and operatively connected with said gate, and means connecting one end of said member to said under frame on the side adjacent the side gate for sliding movement relative to the under frame.

4. A dump car comprising an under frame, a tilting bed mounted thereon, side gates connected with the opposite sides of the bed to swing downwardly into open position, and mechanism for controlling the operation of each gate comprising a member having pivotal connection with said bed and operatively connected with its respective gate, and means connecting one end of said member to said under frame for movement in an arc substantially concentric with the tilting axis of said bed.

5. A dump car comprising an under frame, a tilting bed mounted thereon, a side gate connected with the bed to swing downwardly into open position, and mechanism for controlling the operation of said gate comprising a lever pivotally mounted on said bed, link means operatively connecting the upper end of said lever with said gate, and means connecting the lower end in an arc substantially concentric with the tilting axis of said bed.

6. A dump car comprising an under frame, a tilting bed mounted thereon, a side gate connected with the bed to swing downwardly into open position, and mechanism for controlling the operation of said gate comprising a lever pivotally mounted on said bed concentrically with the tilting axis thereof, link means connecting the upper end of said lever with said gate, and a guide on said under frame with which the lower end of said lever has sliding, guided engagement for controlling the angle of said lever relative to said bed.

7. A dump car comprising an under frame, a tilting bed mounted thereon, a side gate connected with the bed to swing downwardly into open position, and mechanism for controlling the operation of said gate comprising a lever pivotally mounted on said bed concentrically with the tilting axis thereof, link means operatively connecting the upper end of said lever with said gate, a guide track mounted on said under frame and curved substantially concentrically with a tilting axis of said bed, and means connecting the lower end of said lever for sliding, guided engagement with said track.

8. A dump car comprising an under frame, a tilting bed mounted on said under frame on two rocking fulcrums spaced laterally from the center of said under frame, said bed being adapted for lateral dumping movement in either direction about one or the other of said rocking fulcrums, side gates connected with the opposite sides of the bed to swing downwardly into open position, and gate operating mechanism comprising links operatively connected with each gate, levers pivotally mounted on said bed and having their upper ends connected to said links, and guide means on said under frame with which the lower ends of said levers have sliding, guided engagement.

9. A dump car comprising an under frame, a tilting bed mounted on said under frame on two rocking fulcrums spaced laterally from the center of said under frame, said bed being adapted for lateral dumping movement in either direction about one or the other of said rocking fulcrums, side gates connected with the opposite sides of the bed to swing downwardly into open position, and gate operating mechanism comprising links operatively connected with each of said gates, levers pivotally mounted on said bed substantially concentrically with said rocking fulcrums, the upper ends of said levers being connected to said links, and curved guide tracks on said under frame with which the lower ends of said levers have sliding, guided engagement.

10. A dump car comprising an under frame, a tilting bed mounted on said under frame on two rocking fulcrums spaced laterally from the center of said under frame, said bed being adapted for lateral dumping movement in either direction about one or the other of said rocking fulcrums, side gates connected with the opposite sides of the bed to swing downwardly into open position, and gate operating mechanism comprising links having their outer ends operatively connected with each of said gates, levers pivotally mounted on said bed concentrically with said rocking fulcrums, means pivotally connecting the upper ends of said levers to the inner ends of said links, laterally spaced guide tracks mounted on said under frame and curved substantially concentrically with the opposite rocking fulcrum, and rollers on the lower ends of said levers having sliding, guided engagement with said tracks.

11. A dump car comprising an under frame, a tilting bed mounted on said under frame on two rocking fulcrums spaced laterally from the center of said under frame, said bed being adapted for lateral dumping movement in either direction about one or the other of said rocking fulcrums, side gates connected with the opposite sides of the bed to swing downwardly into open position, and gate operating mechanism comprising supporting links pivoted to said bed and supporting the tilting weight of each gate, said links being movable to gate opening position independently of movement of their respective gates, controlling links pivotally connected to said supporting links, levers pivotally mounted on said bed and having their upper ends connected to said controlling links, and guide surfaces on said under frame with which the lower ends of said levers have sliding, guiding engagement.

12. A dump car comprising an under frame having laterally spaced fulcrum seats therein, a tilting bed, laterally spaced fulcrum brackets extending down from said bed, bearing pins carried by said brackets and adapted to engage in said fulcrum seats, side gates pivotally connected with the opposite sides of the bed to swing downwardly into open position, levers pivotally mounted on said bed concentrically with said bearing pins, link means pivotally connected to the upper ends of said levers and operative to control the opening of said gates, laterally spaced guide tracks mounted on said under frame, each of said guide tracks being curved on an arc substantially concentric with the fulcrum seat at the opposite side of said under frame, and rollers on the lower ends of said levers engaging with said guide tracks.

13. A dump car comprising an under frame, a tilting bed mounted thereon, a side gate connected with the bed to swing downwardly into open position, and mechanism for controlling the operation of said gate comprising a lever pivotally mounted on said bed concentrically with the tilting axis thereof, link means operatively connecting the upper end of said lever with said gate, a guide track mounted on said under frame and having opposite, outwardly facing grooves therein, the lower end of said lever comprising fork arms engaging over the outer sides of said track, and rollers carried by said fork arms engaging in said grooves.

14. A dump car comprising an under frame, a tilting bed mounted thereon, a side gate pivotally connected with the bed to swing downwardly into open position, a supporting link pivoted at its inner end to said bed concentrically with the pivotal axis of said gate, means supporting the tilting weight of said gate on said link, said link being movable to gate opening position independently of movement of said gate, a stop shoulder on said link adapted to engage said bed for limiting the gate opening movement of said link, a second link pivotally connected to the swinging end of said supporting link, and means operatively connecting said second link to said under frame for pivotal movement about the axis of tilting of said bed for controlling the movement of said supporting link relative to said bed.

15. A dump car comprising an under frame, a tilting bed mounted thereon for rocking movement about laterally spaced fulcrums, side gates connected with the opposite sides of the bed to swing downwardly into open position, a gate controlling link pivotally mounted on said bed under each of said side gates, a projecting foot on each gate adapted to bear downwardly and inwardly on said gate controlling link when the gate is closed, said gate controlling link being movable independently of said projecting foot, and link mechanism including a member pivoted to the bed inwardly of said gate controlling link and operatively connecting each gate controlling link with said under frame.

16. A dump car comprising an under frame, a tilting bed mounted thereon for rocking movement about laterally spaced axes, a side gate connected with the bed to swing downwardly into open position, a gate controlling link pivotally mounted on said bed, a member rigid with said gate and adapted to bear on said gate controlling link when the gate is closed, link mechanism operatively connecting said gate controlling link with said under frame, and cam means on said under frame for swinging said link mechanism to open the gate when said bed is tilted.

17. A dump car of the character described comprising the combination of an under frame, a tilting bed mounted on the under frame, a gate connected to each side of the bed and adapted to swing downwardly to open position when the bed is tilted, and means for controlling the operation of each of the said gates, said means comprising a link pivoted to the bed and operative to control the position of the gate, and means pivoted to the link and to the bed and having sliding connection with said under frame for controlling the position of said link.

18. A dump car of the character described comprising the combination of an under frame, a tilting bed mounted on the under frame, a gate connected to each side of the bed and adapted to swing downwardly to open position when the bed is tilted, and means for controlling the operation of each of the said gates, said means comprising a link pivoted to the bed and operative to control the position of the gate, and means pivoted to the link and to the bed and having sliding connection with said under frame for controlling the position of said link, said last mentioned means comprising a second link pivoted to the first mentioned link, a lever pivoted at one end to the second link and at its intermediate portion to said tilting bed, said lever at its inner end having a roller adapted to ride within an arcuate groove, and means on said under frame providing the said groove.

19. In a dump car, the combination of an under frame, a tilting bed rockable selectively about fulcrums at opposite sides of said under frame, side doors for said bed pivoted thereto at each side thereof, and door controlling mechanisms for each door comprising a member mounted on the bed on the same side of the car as the door controlled thereby, means operatively connecting each of said members with its respective door, and means on said under frame with which the member at the rising side has bearing engagement during substantially the entire tilting movement of the bed, said door controlling mechanisms permitting the descending door on the dumping side to move or to be stopped during the tilting of the bed.

20. In a dump car, the combination of an under frame, a tilting bed rockable selectively about fulcrums at opposite sides of said under frame, side doors for said bed pivoted thereto at each side thereof, and door controlling mechanisms for each door comprising a member carried by the under frame and a cooperating member carried by the bed both disposed on the same side of the car as the door controlled thereby, one of said members being curved substantially concentrically with the fulcrum at the opposite side of the car, and one of said members having sliding guided engagement with the other of said members on the rising side of the bed, and means operatively connecting the member carried by the bed with its respective door, said door controlling mechanisms permitting the descending door on the dumping side to move or to be stopped during the tilting of the bed.

21. In a dump car, the combination of an under frame, a tilting bed rockable selectively about fulcrums at opposite sides of said under frame, side doors for said bed pivoted thereto at each side thereof to swing outwardly and downwardly to dumping position, and door controlling mechanisms for each door comprising a guide member carried by the under frame and a cooperating member pivotally mounted on the bed, both disposed on the same side of the car as the door controlled thereby, one of said members being curved substantially concentrically with the fulcrum at the opposite side of the car, and one of said members guiding the other on the rising side of the bed, and means operatively connecting the member pivotally mounted on the bed with its respective door.

22. In a dump car, the combination of an under frame, a tilting bed rockable selectively about fulcrums at opposite sides of said under frame, side doors pivotally connected with said bed to swing outwardly and downwardly to their dumping position, and door controlling mechanisms for each door comprising a member carried by the under frame and a cooperating member movably carried by the bed, one of said members being curved substantially concentrically with the fulcrum at the opposite side of the car and one of said members guiding the other on the rising side of the bed, and means operatively connecting the member carried by the bed with its respective door.

23. A dump car comprising, in combination a tiltable bed, an under frame supporting the bed for selective rocking movement about laterally spaced fulcrums at opposite sides of the frame, side doors for said bed pivoted thereto at each side thereof to swing outwardly and downwardly to dumping position, and door controlling mechanisms for each door pivotally connected with said door and with said underframe and disposed entirely below the plane of the load carrying surface thereof, said door controlling mechanism comprising lost motion connections between each side door and the under frame at the same side thereof as the door, said lost motion connections holding the ascending door closed and permitting the descending door to open by gravity.

24. A dump car comprising an under frame, a tilting bed mounted thereon, a side gate pivotally connected with the bed to swing downwardly into open position, a supporting link pivoted at its inner end to said bed concentrically with the pivotal axis of said gate, means supporting the tilting weight of said gate on said link, said link being movable to gate opening position independently of movement of said gate, a stop shoulder on said link adapted to engage said bed for limiting the gate opening movement of said link, a second link pivotally connected to the swinging end of said supporting link, and means operatively connecting said second link to said under frame at the same side thereof as said side gate, for controlling the movement of said supporting link relative to said bed.

25. A dump car comprising an under frame, a tilting bed mounted thereon for rocking movement about laterally spaced fulcrums, side gates connected with the opposite sides of the bed to swing downwardly into open position, a gate controlling link pivotally mounted on said bed under each of said side gates, a projecting foot on each gate adapted to bear downwardly and inwardly on said gate controlling link when the gate is closed, said gate controlling link being movable independently of said projecting foot, and link mechanism operatively connecting each gate controlling link to the same side of said under frame as the gate controlled thereby.

26. A dump car comprising an under frame, a tilting bed mounted thereon for rocking movement about laterally spaced axes, a side gate connected with the bed to swing downwardly into open position, a gate controlling link pivotally mounted on said bed, a member rigid with said gate and adapted to bear downwardly and inwardly on said gate controlling link when the gate is closed, and link mechanism pivotally connecting said gate controlling link with said under frame at the same side of said under frame as said side gate.

27. A dump car comprising an under frame, a tilting bed mounted thereon for rocking movement about laterally spaced fulcrums operative to support said bed in substantially stable equilibrium, side gates pivotally connected at their lower edges to the opposite sides of the bed to swing outwardly and downwardly into open position, and gate controlling mechanism for each gate having cooperative association with said under frame on the same side as its respective gate, each of said gate controlling mechanisms comprising a lost motion connection effective at the dumping side to permit the opening movement of the gate to be interrupted while the bed continues to tilt to its maximum dumping angle, each of said gate controlling mechanisms remaining in operative connection with said under frame at the rising side of the bed.

28. A dump car comprising an under frame, a tilting bed mounted thereon for rocking movement about laterally spaced fulcrums, side gates pivotally connected at their lower edges to the opposite sides of the bed to swing outwardly and downwardly into open position, and gate controlling mechanism for each gate pivotally connected with the hinge axis thereof and having sliding connection with said under frame on the same side as its respective gate, each of said gate controlling mechanisms comprising a lost motion connection effective at the dumping side permitting the gate at this side to remain fully closed during the entire dumping movement, whereby if said gate should become frozen fast the bed can tilt fully to dumping position without injury or dislocation of parts.

29. A dump car comprising an under frame, a tilting bed mounted thereon for rocking movement about widely spaced fulcrums, side gates pivotally connected at their lower edges to the opposite sides of the bed to swing outwardly and downwardly into open position and gate controlling mechanism for each gate having pivoted connection with said under frame on the same side as the gate controlled thereby.

30. A dump car comprising an under frame, a tilting bed mounted thereon for rocking movement about widely spaced fulcrums adjacent to the sides of said under frame, side gates pivotally connected at their lower edges to the opposite sides of the bed to swing outwardly and downwardly into open position and gate controlling mechanism for each gate pivotally connected with said under frame on the same side as the gate controlled thereby, each of said gate controlling mechanisms including a lost motion connection permitting the opening motion of the gate at the dumping side to be interrupted while the bed continues to tilt to full dumping position.

31. A dump car comprising an under frame, a tilting bed mounted thereon for rocking movement about fulcrums disposed adjacent to the sides of said under frame, side gates pivotally connected at their lower edges to the opposite sides of the bed to swing outwardly and downwardly into open position, and gate controlling mechanism for each gate pivotally connected with said bed and pivotally connected with said under frame on the same side as the gate controlled thereby.

32. A dump car comprising an under frame, a tilting bed mounted thereon for rocking movement about widely spaced fulcrums disposed adjacent the sides of the under frame and operative to support said bed in substantially stable equilibrium, side gates pivotally connected at their lower edges to the opposite sides of the bed to swing outwardly and downwardly into open position, and gate controlling mechanism for each gate pivotally connected with said bed and pivotally connected with said under frame on the same side as the gate controlled thereby, each of said gate controlling mechanisms including a lost motion connection permitting opening motion of the gate at the dumping side to be interrupted while the bed continues to tilt to full dumping position.

33. In a dump car, the combination of an under frame, a tilting bed rockable selectively about fulcrums at opposite sides of said under frame, side doors pivotally connected with said bed to swing outwardly and downwardly to their dumping position, and door controlling mechanisms for each door comprising a member connected with said under frame and a cooperating member movably carried by the bed, said latter member having bearing engagement with said first named member at the rising side of the bed at a point disposed between the center line of the bed and the door at the rising side thereof, and means operatively connecting the member carried by the bed with its respective door.

34. A dump car comprising an under frame, a tilting bed mounted thereon for rocking movement selectively about laterally spaced fulcrums, side doors pivotally connected to the opposite sides of the bed to swing outwardly and downwardly into open position, and door controlling mechanisms for each door comprising a member mounted on the bed, means for operatively connecting each of said members with its respective door, and means for operatively connecting said members with said under frame, said members being arranged for translational movement with respect to said last named means and said door controlling mechanism permitting the door on the dumping side to move or be stopped during the tilting of the bed, and said door controlling mechanism on the rising side of the bed remaining in operative connection with said under frame.

35. A dump car comprising an under frame, a tilting bed mounted on said under frame for rocking movement selectively about laterally spaced fulcrums, side doors pivotally connected to the opposite sides of the bed to swing outwardly and downwardly into open position, and door controlling mechanisms for each door comprising a member mounted on the bed intermediate its ends, means operatively connecting one end of said member with its respective door and means operatively connecting the other end of said member with the under frame, said member being arranged for translational movement with respect to said last named means and said door controlling mechanism on the dumping side of the bed permitting its associated door to move or be stopped during the tilting of the bed and said door controlling mechanism on the rising side of the bed maintaining its operative connection with said under frame.

36. A dump car comprising an under frame, a tilting bed mounted on said under frame on two rocking fulcrums spaced laterally from the center of said under frame, said bed being adapted for lateral dumping movement in either direction about one or the other of said rocking fulcrums, side gates connected with the opposite sides of the bed to swing downwardly to open position, and gate controlling mechanisms comprising a link operative to control each gate, levers pivotally mounted on said bed and connected at one end to each of said links, a roller carried by the other end of said lever, and means operatively associated with said under frame and cooperating with said roller for controlling the operation of said gates, said gate controlling mechanisms remaining in operative connection with the under frame at the rising side of the bed.

37. A dump car comprising an under frame, a tilting bed mounted on said under frame for rocking movement selectively about laterally spaced fulcrums, side doors pivotally connected to the opposite sides of the bed to swing outwardly and downwardly into open position, and door controlling mechanisms for each door comprising levers mounted on said bed on separate pivots disposed adjacent the same side of the bed as the door controlled thereby, means operatively associated with one end of each of said levers and the doors controlled thereby, a roller carried by the other end of said levers and normally disposed below the pivotal point of connection of said levers with said bed, and means operatively associated with said roller and said under frame, said roller having sliding guided engagement with said last named means and said last named means maintaining its operative association with the under frame at the rising side of the bed during a dumping movement thereof.

38. A dump car comprising an under frame, a tilting bed mounted on said under frame for rocking movement selectively about laterally spaced fulcrums, side doors pivotally connected to the opposite sides of the bed to swing outwardly and downwardly into open position, and door controlling mechanisms for each door comprising levers mounted on said bed intermediate their ends on separate pivots disposed adjacent the same side of the bed as the door controlled thereby, means operatively associated with one end of said levers and with the door controlled thereby and means operatively associated with said under frame with which the other ends of said levers have sliding guided engagement, said last named means maintaining its operative association with the under frame at the rising side of the bed during a tilting movement thereof.

39. A dump car comprising an under frame, a tilting bed mounted on said under frame for rocking movement selectively about laterally spaced fulcrums, side doors pivotally connected to the opposite sides of the bed to swing outwardly and downwardly into open position, and door controlling mechanisms for each door comprising link means pivotally connected with said door, a member pivotally mounted on the bed intermediate its ends and pivotally connected at one end to said link means, the center line between the pivotal axis of said member with the bed and the pivotal axis of the link means with the door being normally below the pivotal axis of the connection of said link with said member, and means with which the other end of said member has sliding guided engagement for controlling the angle of said member relative to said bed.

40. A dump car comprising an under frame, a tilting bed mounted thereon for rocking movement about laterally spaced fulcrums, side gates connected with the opposite sides of the bed to swing downwardly into open position, a gate controlling link pivotally mounted on the bed under each of said side gates, said link serving to transmit gate closing force to said gate at a point below the gate axis and said gate being movable independently of said link, and link mechanism including a member mounted on the bed operatively connecting each gate controlling link to said under frame.

41. A dump car comprising an under frame, a tilting bed mounted on said under frame for rocking movement selectively about laterally spaced fulcrums, side doors pivotally connected to the opposite sides of the bed to swing outwardly and downwardly into open position, and door controlling mechanisms for each door comprising a member mounted on the bed intermediate its ends, link means operatively connecting one end of said member with its respective door, a roller carried on the other end of said member, and means associated with said under frame for cooperating with the roller on said member, whereby the door controlling mechanism on the dumping side of the bed will permit its associated door to be moved or stopped during the tilting of said bed and the door controlling mechanism on the rising side of the bed will maintain its cooperating association with said under frame.

42. A dump car comprising an under frame, a tilting bed mounted thereon, laterally spaced fulcrum supports on said under frame and laterally spaced fulcrums stationarily secured to said bed, said fulcrums cooperating with said fulcrum supports in normally maintaining said bed in substantially stable equilibrium and in defining side pivot axes around which said bed can tilt to either side for dumping, side gates connected with the bed to swing downwardly into open position, and mechanism for controlling the operation of each of said gates comprising a lever pivotally mounted on said bed, means operatively connecting one end of said lever with said gate, and a guide track operatively associated with the other end of said lever and with said under frame, said guide track cooperating with the lever at the rising side of the bed for holding said lever against such pivotal movement relatively to the bed as would permit opening of the gate at the rising side of the bed.

43. A dump car comprising an under frame, a tilting bed mounted thereon, laterally spaced fulcrum supports on said under frame and laterally spaced fulcrums stationarily secured to said bed, said fulcrums cooperating with said fulcrum supports in normally maintaining said bed in substantially stable equilibrium and in defining side pivot axes around which said bed can tilt to either side for dumping, side gates connected with the bed to swing downwardly into open position, and mechanism for controlling the operation of each of said gates comprising a lever pivotally mounted on said bed, means operatively connecting one end of said lever with said gate, a roller carried by the other end of said lever, and means having support on said under frame defining a track surface along which said roller is adapted to travel.

44. A dump car comprising an under frame, laterally spaced fulcrums disposed adjacent to the outer sides of said under frame, a tilting bed supported in substantially stable equilibrium on said under frame and operative to dump to either side about said laterally spaced fulcrums, side gates at opposite sides of the bed hingedly connected with the bed to swing downwardly and outwardly from the side of the bed to open position in the dumping operation, and gate control mechanism for each gate operative at the dumping side to allow the gate to be opened by gravity or to permit the gate to be stopped by an obstruction during continued dumping movement of the bed and serving to close the gate during the righting movement, and operative at the rising side to positively hold the gate closed, each of said gate control mechanisms comprising an arm extending downwardly from each gate below the hinge axis of the gate, a lever pivotally mounted on said bed, link means pivotally connected with the outer end of said lever and operatively associated with said arm, a roller mounted on the inner end of said lever, and a track member for said roller connected with said under frame.

45. A dump car comprising an under frame, laterally spaced fulcrum supports stationarily mounted on said under frame adjacent to the outer sides thereof, a tilting bed supported in substantially stable equilibrium on said under frame and comprising laterally spaced fulcrums stationarily secured to said bed and cooperating with said fulcrum supports, said bed being operative to dump to either side about said laterally spaced fulcrums, side gates at opposite sides of the bed hingedly connected with the bed to swing outwardly and downwardly from the side of the bed to open position in the dumping operation, and gate control mechanism for each gate operative at the dumping side to allow the gate to be opened by gravity or to permit the gate to be stopped by an obstruction during continued dumping movement of the bed and serving to positively close the gate during the righting movement, and operative at the rising side to positively hold the gate closed, each of said gate control mechanisms comprising an arm extending from each gate beyond the hinge axis of the gate, a lever pivotally mounted on said bed at the same side thereof as the gate controlled by said lever, motion transmitting means operatively associated between the outer end of said lever and said arm, and a track member connected with said under frame, the inner end of said lever movably coacting with said track member.

46. A dump car comprising an under frame, laterally spaced fulcrum supports stationarily mounted on said under frame adjacent to the outer sides thereof, a tilting bed supported in substantially stable equilibrium on said under frame and comprising laterally spaced fulcrums stationarily secured to said bed and cooperating with said fulcrum supports, said bed being operative to dump to either side about said laterally spaced fulcrums, side gates at opposite sides of the bed hingedly connected with the bed to swing outwardly and downwardly from the side of the bed to open position in the dumping operation, and gate control mechanism for each gate operative at the dumping side to allow the gates to be opened by gravity or to permit the gates to be stopped by an obstruction during continued dumping movement of the bed and serving to positively close the gates during the righting movement, and operative at the rising side to hold the gate closed, each of said gate control mechanisms comprising a lever pivotally mounted on the bed on a pivot axis disposed intermediate the longitudinal center line of the bed and the hinge axis of the gate which is controlled by that lever, a link pivotally connected at one end with said lever and having its other end operatively associated with said gate for controlling the latter, the inner end of said lever being movable substantially vertically relatively to said under frame, and means establishing an operative connection between the inner end of said lever and said under frame.

47. In a dump car, the combination of an under frame, laterally spaced fulcrum supports stationarily mounted on said under frame, a tilting bed, laterally spaced fulcrums stationarily secured to said bed, said fulcrums cooperating with said fulcrum supports in normally maintaining said bed in substantially stable equilibrium and in defining side pivot axes around which said bed can tilt to either side for dumping, side doors at opposite sides of the bed hingedly connected with the bed to swing outwardly and downwardly from the side of the bed to open position in the dumping operation, and automatic door controlling mechanisms for each door, each comprising a member movably mounted on the bed on the same side of the bed as the door controlled thereby, each of said members being operatively connected with its respective door, and means on said under frame with which the member at the rising side of the bed has traveling bearing engagement during tilting movement of the bed for holding the door at the rising side closed, said door controlling mechanisms permitting the door at the dumping side to move to open position or to be stopped during the tilting of the bed.

48. In a dump car, the combination of an under frame, laterally spaced fulcrum supports stationarily mounted on said under frame adjacent to the outer sides thereof, a tilting bed, laterally spaced fulcrums stationarily secured to said bed, said fulcrums cooperating with said fulcrum supports in normally maintaining said bed in substantially stable equilibrium and in defining substantially stationary side pivot axes around which said bed can tilt to either side for dumping, side doors at opposite sides of the bed hingedly connected with the bed to swing outwardly and downwardly from the side of the bed to open position in the dumping operation, and automatic door controlling mechanisms for each door, each comprising a member movably mounted on the bed on the same side of the bed as the door controlled thereby, means operatively connecting the outer end of each of said members with its respective door, a roller mounted on the inner end of each of said members, and means on said under frame defining guide surfaces against which said rollers have rolling bearing engagement, the roller on the member at the rising side of the bed having rolling bearing engagement against one of said guide surfaces during substantially the entire tilting movement of the bed for holding the door at the rising side closed, said door controlling mechanisms permitting the door at the dumping side to move to open position or to be stopped during the tilting of the bed in dumping, and causing the closing of the door at the dumping side in the righting of the bed.

WILLIAM L. BURNER.